Aug. 9, 1932.   E. P. ENGSTROM   1,870,801
SPROCKET AND CHAIN CONSTRUCTION
Filed Nov. 5, 1930

INVENTOR
ERNEST P. ENGSTROM
BY Ely Barrow
ATTORNEYS

Patented Aug. 9, 1932

1,870,801

UNITED STATES PATENT OFFICE

ERNEST P. ENGSTROM, OF AKRON, OHIO, ASSIGNOR TO JOHN R. GAMMETER, OF AKRON, OHIO

SPROCKET AND CHAIN CONSTRUCTION

Application filed November 5, 1930. Serial No. 493,564.

This invention relates to sprocket and chain constructions and particularly to such constructions as used on tractors, earth digging devices and the like where the sprocket and chain are subjected to the abrasive action of sand and grit.

Heretofore, sprockets and chains used on equipment of the kind referred to have been subject to rapid wear, entailing frequent adjustments or replacements. The rapid wear is due to the action of sand and grit between the contacting metal surfaces of the sprocket and chain.

The general purpose of the invention is to improve upon sprocket and chain constructions whereby the wearing of the sprocket and chain is reduced to a minimum.

More particularly the invention has for its object the construction of sprockets with integral portions of rubber so placed as to provide contact of metal on rubber or the like where the chain meshes into the sprocket, the rubber bonded by vulcanization to the sprocket in pockets therein and being resistant to abrasion and apparently embedding temporarily the particles of sand or grit which may lodge between the sprocket and chain in such a way as to reduce their deleterious action on the chain and also having a cushioning effect tending to reduce noise.

The foregoing and other objects of the invention are attained in the sprocket and chain construction illustrated in the accompanying drawing and described below. It is to be understood that the invention is not limited to the specific form thereof shown and described.

Of the accompanying drawing.

Figure 1:
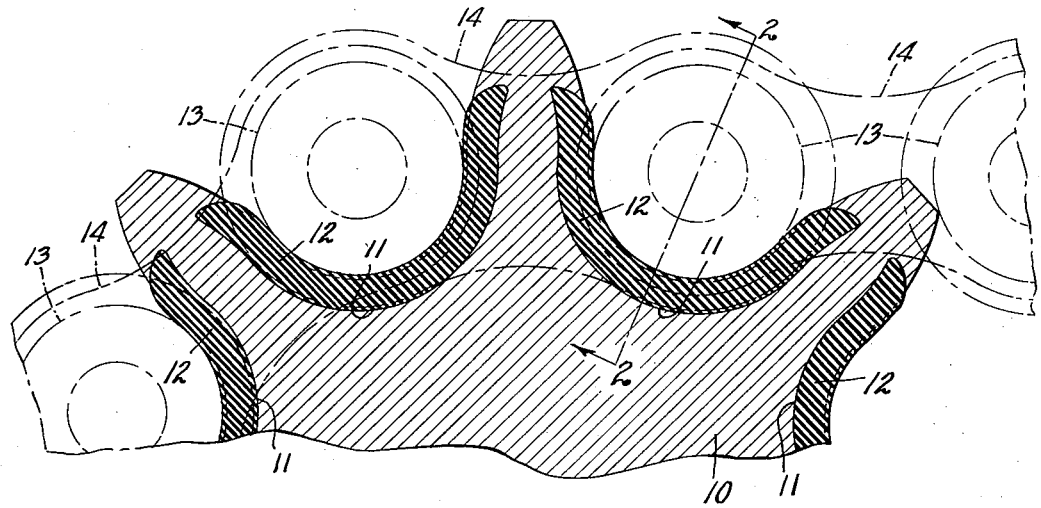
Figure 1 is a section on line 1—1 of Figure 2 through a portion of a sprocket embodying the invention, a chain being shown trained thereover in dotted lines.

Referring to the drawing, the numeral 10 designates a sprocket which may be of usual construction excepting that in the spaces between the teeth and extending from the bottoms thereof, preferably to points slightly beyond the pitch circle of the sprocket, pockets 11, 11 are formed in the sprocket in which bodies 12, 12 of rubber are secured, by bonding by vulcanization to the metal surfaces of the pockets by any of a number of methods known by those skilled in the rubber art for bonding rubber to metal. The pockets 11 are preferably formed with side walls 11ª serving to retain the rubber in the pockets and to protect the sides of the rubber bodies.

The rubber bodies 12 preferably project slightly above the pockets as shown so that substantially the entire load and entire wearing action of the chain upon the sprocket is absorbed by the rubber, the projecting portion of which may yield slightly under the stresses of the driving action between the sprocket and chain.

The rubber bodies 12 are preferably of tough, resilient or elastic rubber capable of withstanding the action of abrasives and comparable in physical properties with the rubber treads of automobile tires and with the rubber heretofore used in water lubricated bearings.

The pins or rollers 13, 13 by which the chain 14 has driving or driven engagement with the sprocket are preferably made of hardened steel to be as resistant as possible to abrasion. When such pins or rollers are employed in combination with a sprocket, the contacting surfaces of which are rubber or the like, there is little wear between the parts and frequent readjustment and replacements are obviated.

Figure 2:
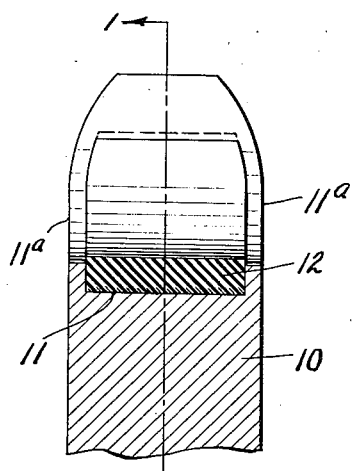
Figure 2 is a section on line 2—2 of Figure 1.
Figure 3:
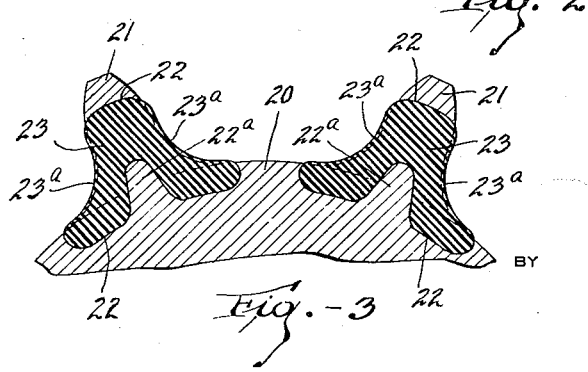
Figure 3 is a view similar to Figure 1 of a modified form of sprocket embodying the invention.

In Figure 3 there is shown an embodiment of the invention as especially adapted for sprockets having widely spaced teeth. In this form the sprocket 20 having widely spaced teeth 21, 21 is formed with pockets 22 formed in the teeth and in the adjacent part of the body of the sprocket at the bases of the teeth to receive rubber bodies 23 which are vulcanized therein as described in connection with Figures 1 and 2, these rubber bodies projecting slightly beyond the surfaces of the sprocket to provide rubber surfaces 23ᵃ for taking the load and wear of the sprocket chain on the sprockets. The rubber bodies 23 extend upwardly of the teeth beyond the pitch circle of the sprocket just as in Figures 1 and 2. To prevent displacement of the rubber from the pockets, these are formed so that a metal portion 22ᵃ extends radially into the body of the rubber.

Modifications of the invention may be resorted to without departing from the spirit thereof or the scope of the appended claims.

What is claimed is:—

1. A sprocket and chain construction comprising a sprocket having pockets formed in the spaces between the teeth which extend from the bottom of such spaces to points somewhat beyond the pitch circle of the sprocket, bodies of tough, elastic, abrasive-resistant rubber in said pockets and bonded by vulcanization to the surfaces thereof, said rubber bodies projecting slightly above the pockets, and a chain for said sprocket, said chain having driving members of hardened steel thereon for meshing with said sprocket, said members bearing on the rubber surfaces at the bottoms and sides of said spaces.

2. A sprocket and chain construction comprising a sprocket having pockets formed in the spaces between the teeth which extend from the bottom of such spaces to points somewhat beyond the pitch circle of the sprocket, and bodies of tough, elastic, abrasive-resistant rubber in said pockets and bonded by vulcanization to the surfaces thereof, said rubber bodies projecting slightly above the pockets, and said chain having elements thereon bearing upon the surfaces of said rubber at the bottoms and sides of said spaces.

3. A sprocket and chain construction comprising a sprocket having pockets formed in the spaces between the teeth which extend from the bottom of such spaces to points somewhat beyond the pitch circle of the sprocket, bodies of tough, elastic, abrasive-resistant rubber in said pockets and bonded by vulcanization to the surfaces thereof, and a chain for said sprocket, said chain having driving members of hardened steel thereon for meshing with said sprocket, said members bearing upon the surfaces of said rubber at the bottom and sides of said spaces.

4. A sprocket and chain construction comprising a sprocket having pockets formed in the spaces between the teeth which extend from the bottom of such spaces to points adjacent the pitch circle of the sprocket, bodies of tough, elastic, abrasive-resistant rubber in said pockets and bonded by vulcanization to the surfaces thereof, said rubber bodies projecting slightly above the pockets, and a chain for said sprocket, said chain having driving members of hardened steel thereon for meshing with said sprocket, said members bearing upon the surfaces of said rubber at the bottoms and sides of said spaces.

5. A sprocket construction comprising a sprocket having pockets formed in the spaces between the teeth which extend from the bottom of such spaces to points somewhat beyond the pitch circle of the sprocket, and bodies of tough, elastic, abrasive-resistant rubber in said pockets and bonded by vulcanization to the surfaces thereof.

6. A sprocket construction comprising a sprocket having pockets formed in the spaces between the teeth which extend from the bottom of such spaces to points adjacent the pitch circle of the sprocket, and bodies of tough, elastic, abrasive-resistant rubber in said pockets and bonded by vulcanization to the surfaces thereof, said rubber bodies projecting slightly above the pockets.

7. A sprocket and chain construction comprising a sprocket having pockets formed in the spaces between the teeth which extend from the bottom of such spaces to points adjacent the pitch circle of the sprocket, bodies of tough, elastic, abrasive-resistant rubber in said pockets and bonded by vulcanization to the surfaces thereof, and a chain for said sprocket, said chain having driving members of hardened steel thereon for meshing with said sprocket, said members bearing upon the surfaces of said rubber at the bottoms and sides of said spaces.

8. A sprocket construction comprising a sprocket having pockets formed in the spaces between the teeth which extend from the bottom of such spaces to points adjacent the pitch circle of the sprocket, and bodies of tough, elastic, abrasive-resistant rubber in said pockets and bonded by vulcanization to the surfaces thereof.

9. A sprocket and chain construction comprising a sprocket having pockets formed therein in the spaces between the teeth thereof, said pockets extending from the bottoms to adjacent the pitch circle of the sprocket at each side of the spaces between the teeth, the pockets being closed at the sides of the sprocket, and elements of tough, abrasion-resisting rubber bonded by vulcanization in said pockets, the outer surfaces of said element extending outwardly of the adjacent surfaces of the sprocket, said chain having members thereon adapted to bear against said rubber surfaces at the bottom and sides of said spaces.

ERNEST P. ENGSTROM.